Patented Nov. 26, 1940

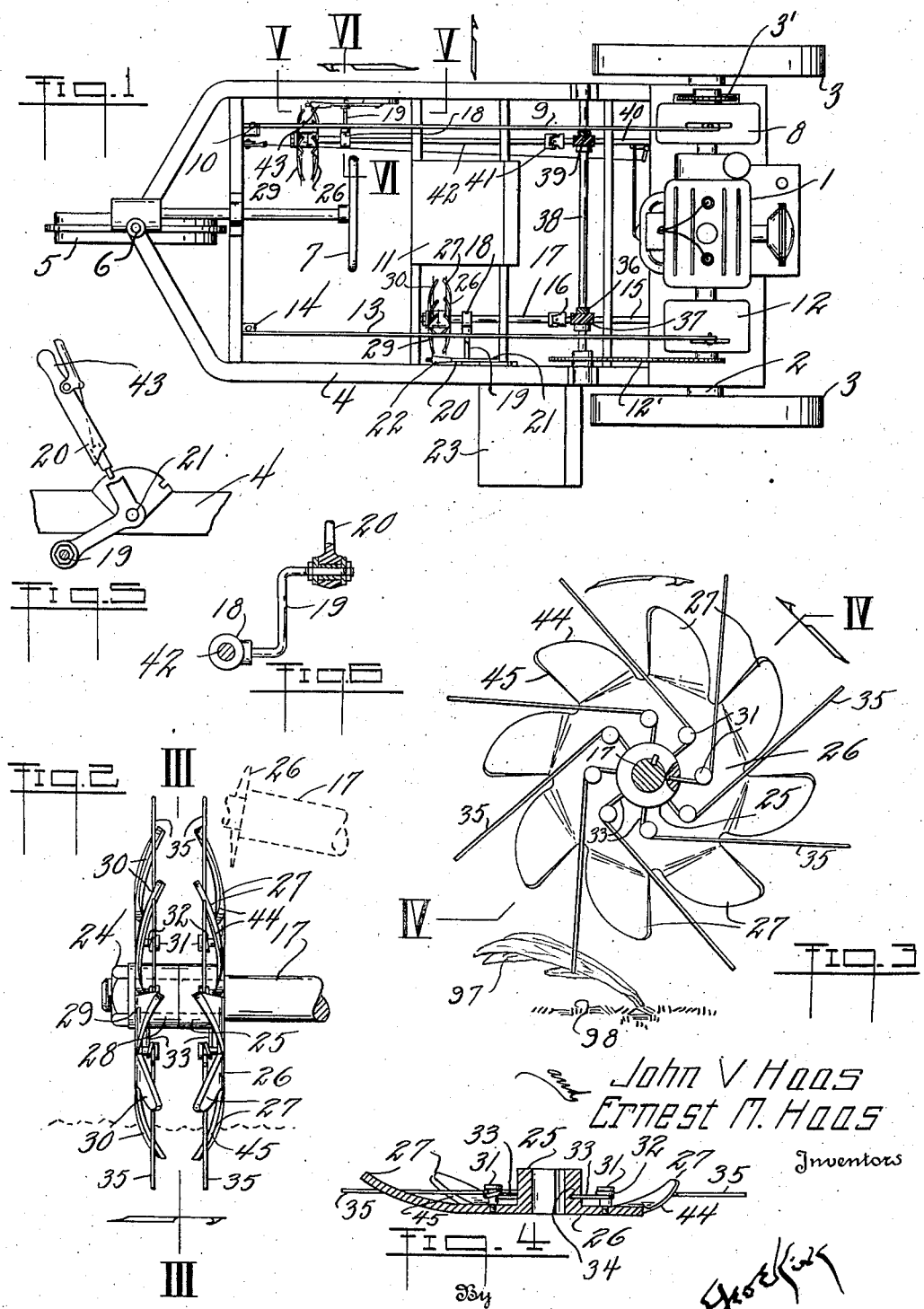
Nov. 26, 1940. J. V. HAAS ET AL 2,223,035
INTRAROW DEPLANTING MECHANISM
Filed March 18, 1939 2 Sheets-Sheet 1
John V Haas
Ernest M. Haas
Inventors

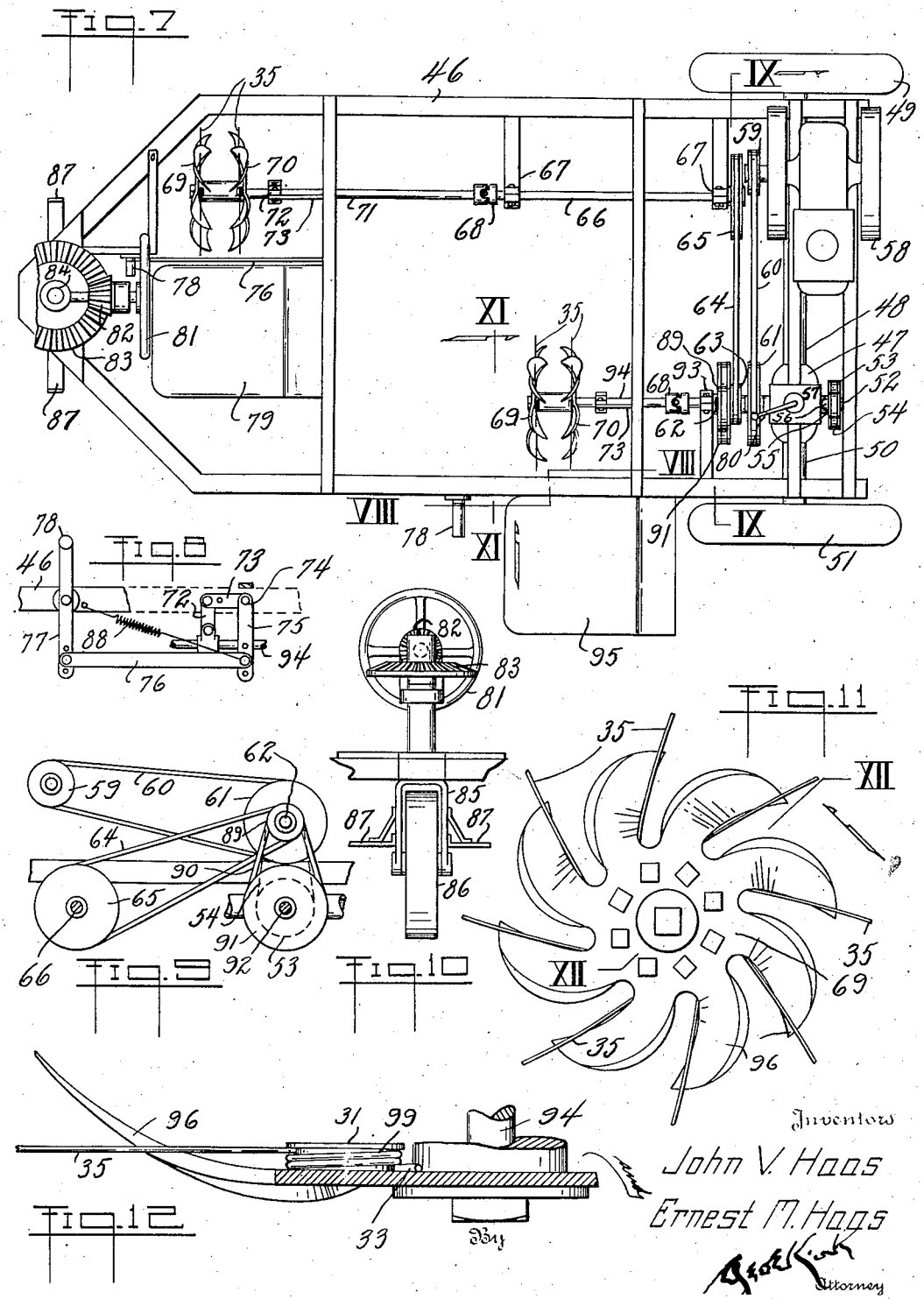

2,223,035

UNITED STATES PATENT OFFICE 2,223,035

INTRAROW DEPLANTING MECHANISM

John V. Haas and Ernest M. Haas, Perrysburg, Ohio

Application March 18, 1939, Serial No. 262,586

5 Claims. (Cl. 97—15)

This invention relates to establishing, in plant rows wherein growing plants are in proximity, an effective thinning or sparsing thereof for contributing to advantage as there is growth and the crop approaches maturity and thereby adequately allowing for growth, as in the instance of beet blocking, cotton, etc.

This invention has utility when incorporated in power apparatus for handling more than one row, in fending the retained growing plant and cutting out the plant excess, and which may be effective even in self-propelled equipment.

Referring to the drawings:

Fig. 1 is a plan view of an embodiment of the invention generally in a self-propelled vehicle;

Fig. 2 is a detail view on an enlarged scale of the controllable sparser device, the fragmentary view shown by dotted line position disclosing the extent of take out to which the device may be lifted;

Fig. 3 is a section on the line III—III, Fig. 2, showing details of the fender mounting in the sparser;

Fig. 4 is a section on the line IV—IV, Fig. 3, showing a cross-section of the sparser after disk;

Fig. 5 is a section on the line V—V, Fig. 1, showing the control handle connection to the sparser elevator and lowerer;

Fig. 6 is a section on the line VI—VI, Fig. 1, showing the control lever for the elevator and lowerer device of the sparser;

Fig. 7 is a plan view, with parts broken away, of an embodiment of the invention in the preferred form of adaptation in self-propelled vehicle;

Fig. 8 is a section on the line VIII—VIII, Fig. 7, showing the control handle for adjusting the cutting disk pair or unit toward the ground or operating position;

Fig. 9 is a view on the line IX—IX, Fig. 7, showing features of the transmission connections;

Fig. 10 is a fragmentary front view of the device of Fig. 7 showing the steering or caster wheel in front;

Fig. 11 is a view on the line XI—XI, Fig. 7, looking into the forward disk of the cutter pair; and Fig. 12 is an enlarged section on the line XII—XII, Fig. 11.

Prime mover or gas engine 1 is shown mounted above rear axle 2 having ground wheels 3 mounting chassis 4 having front caster wheel 5 on shaft 6, shifted by rotating steering wheel 7 and thereby controlling the direction of travel of this vehicle unit. From this prime mover 1 transmission speed reduction 8 has reduced speed travel for actuating the ground wheels 3 through gearing 3' of this motor vehicle. From this transmission 8 extends, forwardly of the chassis 4, rod 9 to control lever 10 in position adjacent station 11 so that the operator for the steering wheel 7 may also control the cutting in and cutting out as well as rate of speed for the propulsion of this vehicle. Additionally, there is provided supplemental different speed reduction or transmission 12 from which extends forwardly control rod 13 to control lever 14 also in position to be manipulated by the vehicle operator at the station 11. This transmission 12 through gearing 12', shaft 38 and gearing 37, 36, rotates actuating shaft 15 parallel to the direction of travel of the vehicle and forwardly. This shaft 15 has universal joint 16 for driving section 17 as held by bearing 18 from which extends arm 19 controlling this shaft 17 as against varying toward or away from the side of the chassis 4. This arm 19 is connected to hand lever 20 having fulcrum 21 so that as grip 22 is shifted by an operator at station 23, the arm 19 may be raised or lowered and thereby rock the shaft section 17 shifted in a vertical plane.

The free end of this shaft section 17 has thereon nut 24 (Fig. 2) mounting after hub 25 carrying disk 26 with diagonally dished teeth 27 as rotary cutters. Opposing this hub 25 is a forward hub 28 having complementary or opposing rotary disk 29 having oppositely dished cutting teeth 30. The teeth 30 accordingly extend in toward the teeth 27. The dishing of the cutter disk 29, 30, is convex toward the direction of travel of the vehicle 4 while the dishing of the cutter disk 26, 27, is concave toward the direction of vehicle travel.

There may be supplemental care in the handling or operation hereunder by providing screws or pins 31 (Fig. 4), about which may be wrap 32 of spring coil wire having anchoring end 33 in opening 34 in the hub 25. From this wrap 32 the opposite end of this wire may proceed as fending arm 35 of greater radial extent than the teeth 27, 30, of the cutting disks. Accordingly, as the apparatus is operated and there is a tendency to lower toward a row of growth in one of the parallel rows of a field, the fending arms 35 tend to strike the growth in advance of the cutter and as the vehicle progresses will fend, clear of the cutting disk, the vegetation which may escape the cutter on the after side as well as clear from the cutter on the forward side in the event it be desired to have the fending arm on each of the disks. There is thus a measure of isolation for the plant growth as local between the region of the disks concave toward each other that such may be efficient in a cutting out or uprooting of the section of growth transversely of a row. This leaves plants standing in the row at the raised position for the pair of disks and thereby clearing the plants as between the disks.

The control handle as elevating and lowering the section 17 and thereby the rotary cutters, may be with a speed against having such progress along the row, that is, with the travel of the vehicle at a relatively slow rate, say of one or two miles per hour. The cutter disk may have a rotation of as much as 100 R. P. M. This would mean that the quick action of the cutting disk or sparser may be effective to eliminate one or more plants from the row and still avoid damage to a section intermediate to be left as a hill in the row. This device in its set-up is, due to the plural stations 11, 23, one which may be fully effective by two operators for two rows in say beet blocking and efficiently controlled therefor at a low cost of power which, while it may be set up as an accessory to a tractor or the disk be controlled by a device from a tractor, is herein a complete self-propelling unit.

The shaft 15 has thereon toothed device 36 in mesh with toothed device 37 on cross-shaft 38 for transmission connection through gearing 39 on shaft 40 parallel to the shaft 15. Joint 41 connects shaft section 42 with this shaft 40 and section 42 extends forwardly to the pair of dished rotary disks at the free end thereof similar to the forward free end of the shaft section 17. Hand lever grip 43 effects the dipping control into and out of operative position. The direction of rotation of these cutter disks is such that sharpened arc-shaped outward edge 44 is in advance and more abrupt radial edge 45 is a follower portion. These fending wires or yieldable means 35, besides their property for easing off or shifting vegetation, cooperate to move any clogging material from the cutter disks as such rise clear of the work position at the row.

Chassis 46 (Fig. 7) may conveniently in practice be adapted for motor vehicle operations to carry differential 47 and rear axle section 48 to ground wheel 49 on one side. Inasmuch as the tread desired, say for two rows afield, is less than normal motor vehicle practice, instead of adopting second rear axle housing section similar to the section 48, a minor section 50 is adapted in the extent from the differential 47 to companion ground wheel 51. This differential 47, instead of having propeller shaft therefor extend forward, has such oriented with shaft 52 (Figs. 7, 9) extending rearwardly, and there carrying pulley sprocket wheel 53 from which extends belt or sprocket chain 54 to smaller pulley 55 on shaft 56 from ordinary transmission 57.

Prime mover or gas engine 58 may be effective through wheel 59 and chain 60 to drive pulley 61 on shaft 62 for the transmission 57. It is thus seen that the drive from the transmission 57 to the propeller shaft 52 is for a reduced rate of travel and is thus adapted to standard transmissions in motor vehicle practice, with the purpose that this propulsion rate may be say in the range of one, two or three miles per hour afield.

Parallel to this sprocket wheel 61 is wheel 63, from which extends sprocket belt 64 to larger pulley wheel 65 on shaft 66 extending forwardly in the chassis 46. There is thus from the driving transmission 57 a take-off, not through the transmission, but at a higher speed of rotation than the shaft from the gas engine for rotating this shaft 66, carried in bearings 67 from the chassis 46 and effective through universal joint 68 to rotate disks 69, 70, as dished toward each other and at the free end of shaft section 71. This shaft section 71 has upstanding therefrom link 72 to arm 73 from rock shaft 74 having depending arm 75 adjustably connected to link 76 extending forwardly to control lever 77 having handle or grip 78 adjacent station 79 for the driver of the chassis.

Handle 80 may set the speed for the transmission afield. Steering wheel 81 adjacent the seat 79 may be effective through beveled pinion 82 and gear 83 for shifting stem 84 and therewith fork 85 carrying front wheel 86. This directing or turning operation may be primarily at the end of the rows or in shifting the vehicle from places out of working afield. However, in the field as going down the row, the forks 85 may have foot pieces 87 which may be engaged by the operator in the seat 79 and thus permit the operator to direct the vehicle properly in the rows across the field, with hands free for operating the grip 78 in locating the cutting disks 69, 70, and, if such can be effected with one hand, the other hand is free for clearing up or picking out any growth or condition not properly effected by the cutting disks due to the relatively slow travel of the vehicle. Spring 88 normally holds this disk 69, 70, clear of the ground and the operator effects the depression by pulling the handle 78 toward his position in the station 79, or pushing of the handle 78 forward from the station 95.

Parallel to these shafts 66, 71, and adjacent the opposite side of the chassis 46 is wheel 89 adjacent the wheel 63 with belt or chain 90 therefrom to lower wheel 91 on shaft section 92 in bearings 93 carried by the chassis 46. Universal joint 68 from the shaft section 92 carries shaft section 94 to cutting disk pair 69, 70, adjacent station 95 with control handle 78 for similar shifting action in lowering such into working position against the resistance of spring 88. The respective disks are provided with pitch-providing blades or teeth 96 to such extent of dishing and axially of the mountings therefor that, in their high speed of rotation, effective throwing of cut dirt or vegetation occurs out of the position acted upon, say as from the row to between the rows. As to growth 97 along row 98, importance arises that such not be mutilated by the cutting action of the disk. Accordingly, flexible fenders or wires 35 are mounted on pins 31 and have central coil 99 for desired torsion as held for this portion 35 as to anchoring portion 33.

It is to be noted that the teeth or arms 30 are dished for an angle or twist. This is preferably to such an extent that the cutting edge at its root is in advance of the plane of the disk, or outside of the pair of disks, more particularly as to the forward or initially active disk of the pair. Such cutting edge as thus tapered and given the pitch is effective to throw the selected matter clear of the row at the relatively high speed of rotation of the disk compared to the travel rate of the vehicle. This means that the action of the cutting edge 44 does not drag along but insures a cut at an angle which cuts out or crosswise from the row. It does not tend to lift direct earth which may be hard or caked but definitely, sharply cuts thereinto. Furthermore, the twist insures that, at the rate of rotation, the cut dirt is thrown out of the line of growth in the row to the space between the pair of rows. The dirt is thus cut and definitely or positively thrown out of the spacing between the growths left in the row. The growth is not dragged out but is definite in leaving clear ground space between the growths left standing, with absence of piling or throwing up of dirt on such growths left in the row. The operation is one which may be selectively effective even at the propulsion speed of one or two miles per hour.

This is of special value in the thin drilling, say of beets as sugar beets, which may be as few as a seed to a drill. Of course, it has been found at times some seeds produce more than one growth. In this type of row, say with the drill for seeds two inches apart, there may be sparsing effected by the disclosure herein entirely effective in this blocker device independently of supplemental hand work. In fact, test operations have shown that growth in a field where only this machine was effective did not detract from the tonnage compared with a hand work beet blocking. In fact, it has shown an increased tonnage of as much as 2 per cent. In the type of seeding which has not been single drill, the blocking as effected hereunder, which leaves the row clear as to the plants removed, means that there is not necessity for lifting dirt off of vegetation which it is desired to retain in the row. Accordingly, even in such rows where supplemental hand work thinning may be in order, the hand work is reduced as much as 60 to 75 per cent by the machine herein.

These foot pieces or treadles 87 are steering control devices which in practice as afield may be jiggled or wiggled in their position as to the vehicle and due to the transit of the vehicle this oscillation is transmitted to the tool and is adapted to vary the range of operation of the tool and its condition for sparsing action in the row and thereby control or vary the cutting action therefrom.

What is claimed and it is desired to secure by United States Letters Patent is:

1. Sparsing means for parallel growth rows afield embodying a vehicle, an actuating shaft carried thereby and extending in the direction of vehicle travel, a pair of opposing inwardly dished cutter disks, flexible radiating wire means rotatable with the disks and movable relatively thereto in shifting material as to the disks, and control means for placing the disks into and out of row cutting position.

2. Sparsing means for growth in rows afield embodying an oppositely dished rotary cutter pair of disks, and radiating wire fending means extending beyond the disks and movable therebetween.

3. Sparsing means for parallel growth rows afield embodying a vehicle, an actuating shaft carried thereby, a drive shaft having transmission joint connection to the actuating shaft, a pair of opposing circular cutter disks each providing an annular series of radially extending blades, said disks being dished toward each other and on said actuating shaft in providing one convex face toward the direction of travel, and disk shifting control means for placing the disks into and out of row cutting position for isolating as hills portions of the rows.

4. Sparsing means for growth in rows afield embodying an oppositely dished rotary pair of circular cutter disks each providing an annular series of radially extending axially offset blade means.

5. Sparsing means for parallel growth rows afield embodying a vehicle, an actuating shaft carried thereby, a cutter disk on the shaft, fending means rotatable with, mounted directly on, and extending to act beyond the disk, and control means for placing the disk into and out of row cutting position.

JOHN V. HAAS.
ERNEST M. HAAS.